UNITED STATES PATENT OFFICE.

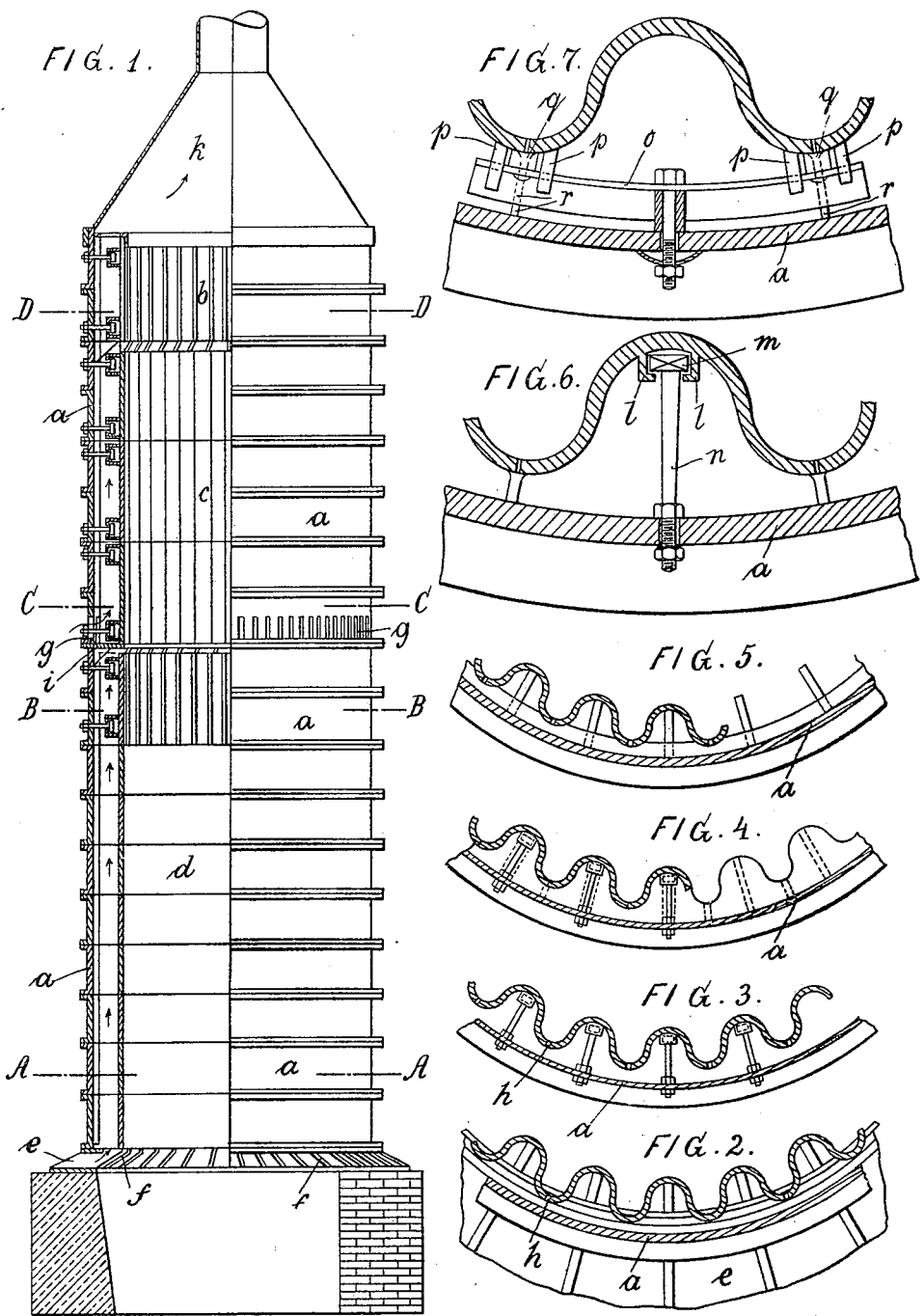

EWALD HUGO STEIN, OF SABLON, NEAR METZ, GERMANY.

IRON SHAFT-FURNACE FOR BURNING CEMENT, &c.

SPECIFICATION forming part of Letters Patent No. 670,212, dated March 19, 1901.

Application filed May 15, 1900. Serial No. 16,751. (No model.)

*To all whom it may concern:*

Be it known that I, EWALD HUGO STEIN, engineer, a subject of the Emperor of Germany, and a resident of No. 50 Kaiser Wilhelmstrasse, Sablon, near Metz, in the Empire of Germany, have invented a certain new and useful Improved Iron Shaft-Furnace for Burning Cement, Lime, and the Like, of which the following is an exact, full, and clear description.

This invention relates to a continuously-working iron shaft-furnace for burning cement, lime, and similar materials, such furnace working with natural or artificial draft.

This new iron shaft-furnace is characterized in its essential features by the fact that the radiating heat is used for the preparatory heating of the air for combustion or for the preparatory drying of the fresh supply of fuel. The air for combustion is not only fed from below through the furnace-shaft, as according to the generally-known systems, but also transversely through the walls of the furnace close to the part where the combustion takes place. The furnace is divided in its principal parts — namely, preparatory-heating, burning, and annealing shafts — into separately-built parts, which are provided with an exterior jacket through which air is fed for cooling the burning-shaft and for the preparatory heating of the air for combustion and for the preparatory drying of the fuel. The parts of the shaft-furnace consist of single segments, which can under the action of the heat move freely in all directions and be replaced separately. By this construction of the iron shaft-furnace a considerable saving of fuel is attained and also a livelier combustion, quicker clinkering, and more preferable cooling insured, the efficiency of such furnace being consequently considerably increased. The cooling of the burning-shaft guarantees greater durability of the furnace and reduces interruptions in working same to a minimum, especially as damaged parts of the furnace can be readily and quickly repaired by replacing the respective segments.

Iron shaft-furnaces for burning cement, lime, and the like are known *per se*. In these furnaces the roasting of the charge, which cannot be avoided in furnaces having a refractory lining, is overcome and a regular working of the furnace insured; but these iron furnaces show the great drawback that a large quantity of the heat generated in the furnace is lost through radiation and that the furnace is destroyed or quickly damaged in the burning or clinkering zone proper and that these damaged parts cannot be readily and quickly repaired. These drawbacks are effectively overcome by the construction of iron shaft-furnaces according to the present invention.

On the accompanying drawings is shown the construction of such new iron shaft-furnace.

Figure 1 is a partly-elevational and partly-vertical section through the shaft-furnace. Figs. 2, 3, 4, and 5 are horizontal sections on the lines A A B B C C D D of Fig. 1, drawn on a larger scale. Figs. 6 and 7 are detailed sectional views through the jacket or casing of the furnace, which show different ways of securing the segments forming the casing.

The shaft-furnace is a jacketed iron furnace of nine to ten meters in height and 2.5 to three meters diameter inside. The exterior casing $a$ is formed of sheet-metal or cast-metal rings or such annular pieces, which are united by screwed flanges or by riveting in a suitable manner.

The inner shaft-furnace (burning-shaft) proper consists of three separate parts — namely, the upper preparatory-heating chamber $b$ of about 1.5 meters in height, the central burning or clinkering chamber $c$ of three to 3.5 meters in height, and the lower cooling or annealing chamber $d$ of four to five meters in height. Each of these parts of the furnace is made from single iron rings of about 0.5 meter in height, 2.5 to three meters in diameter, and, if of cast-iron, twenty-five to thirty millimeters thickness of the wall. These single rings are again composed of single segments. This is done partly for the purpose of decreasing the tension caused by the casting, as also for enabling by the heat an expansion of the annular parts on all sides, and for preventing as far as ever possible the destruction of the rings by fissures and cracks. The separation of the rings b c d into single segments for readily replacing damaged parts of the furnace is, however, of special moment. The construction is preferably of such a nature that the number, as also the height, of the annular segments increase toward the burning or clinkering chamber c. While the rings in the cooling-chamber d only consist of eight to ten segments of about 0.5 meter in height, their number increases in the burning-chamber c, where the greatest heat prevails, to twenty-five to thirty segments for each ring, which in this chamber also are double the height of the rings in the cooling-chamber. The result attained is that the lateral expansion of the single annular segments is very small in proportion to the linear expansion, so that by the lateral expansion an unfavorable strain on the rings does not take place.

In order to also overcome the injurious influence or effects of the linear expansion, the furnace-shaft is so constructed that the annular segments of the single chambers b c d of the shaft can extend in a longitudinal direction. For this purpose both the cooling-shaft d and the burning or preparatory-heating shaft c are constructed independently of one another. The cooling-shaft d is mounted directly on the base-plate e, while there is a small free space between the cooling-shaft d and the burning-shaft c as also between the latter and the preparatory-heating shaft b. This is effected in such a manner that both the load of the burning-shaft c and that of the preparatory-heating shaft b are separately carried by the external casing a and transmitted by the latter to the basement. By this separation of preparatory-heating, burning, and cooling shafts the object of readily replacing the damaged segments is also fulfilled.

By the arrangement of the external casing a the radiation of the heat of the inner shaft-furnace is also prevented, and this heat is utilized for the preparatory heating of the air for combustion. Air is admitted at two parts—namely, through the slots or openings f of the base-plate e below on the cooling-shaft d, as also through the slots g of the casing a at the lower end of the burning-shaft c. The cold air entering through the base-plate e passes partly through slotted openings h between the single segments of the rings forming the cooling-shaft d and accelerates the cooling of the burned masses, while the greater part of this air is used for the exterior cooling of the part d of the shaft. After a suitable preparatory heating on account of the contact with the shaft d the air passes above into the cooling-shaft d in order to be positively fed therefrom to the burning-shaft c close to the part where the combustion takes place. The current of air that is fed through the slots or openings g of the casing a has for its object to prevent the wall of the burning-shaft c from being excessively heated, while the air heated by the contact with the shaft can also be utilized for the preparatory drying of the material in the shaft b. For this purpose the construction is such that the air is fed from the chamber between the casing a and shaft c either compulsory through the preparatory-heating shaft b or can be freely conducted to the chimney k. The segment-plates forming the rings for the shafts b c d are secured in such a manner that the above-mentioned lateral and linear expansion can take place without such plates being subjected to unfavorable strain and that the damaged plates can, moreover, be readily and quickly replaced.

Figs. 6 and 7 show examples of methods of securing the segment-plates. On the back part of each plate are projections or lugs l, Fig. 6, forming a slot, between which the oblong head m of a stay-bolt n passes, that is secured in the casing a in a suitable manner, so that the head allows of the necessary play for the movement of the plate. According to Fig. 7, annular pieces o of angle-iron are secured within the casing a at certain distances by means of stay-bolts. The recessed tappets p of the plates fit on the vertical stays of these annular pieces o. The joints between the segment-plates are covered by rods q, secured to the annular pieces o, such rods being supported by a stud r against the casing a, so that the annular pieces o are relieved of lateral pressure. With both means of securing, a replacement of each single segment-plate can be readily and quickly effected without it being necessary to alter the position of the neighboring plates.

As regards the shape of the segment-plates forming the rings for the shafts b c d, it may be observed that they are smooth plates or can be constructed as ribbed bodies or in any other suitable manner. In order to sufficiently cool the burning-shaft, it is, however, recommended to make the single segment-plates, as shown in the drawings, undulatory, in order to obtain as large an area as possible for the cooling by the air or its preparatory heating. The undulatory shape has, moreover, the advantage that the material to be burned does not firmly adhere to all parts of the interior of the furnace-shaft, but only to some projecting points and where the greatest cooling takes place, while air-channels remain free between the other part of the wall and the fuel. In this manner an excessive heating of the wall of the furnace is likewise prevented.

Having now particularly described and ascertained the nature of the said invention, I declare that what I claim, and wish to secure by Letters Patent, is—

In an iron shaft-furnace, a base, a jacket supported thereon a burning-shaft within the jacket, air-inlets below the jacket leading to an air-space between the latter and the burning-shaft, air-inlets intermediate of the jacket leading through the wall thereof to said air-space, said inner shaft comprising three sections separated by openings leading through the wall of the same, and means for supporting the sections from the outer jacket, substantially as described.

In witness whereof I have hereunto set my hand in presence of two witnesses.

EWALD HUGO STEIN.

Witnesses:
    A. WOOD,
    D. MARSTELLER.